Dec. 10, 1935.　　　R. L. JEWELL　　　2,024,003

PRESSURE GAUGE

Filed May 5, 1931

INVENTOR.
Raymond L. Jewell
BY
ATTORNEYS.

Patented Dec. 10, 1935

2,024,003

UNITED STATES PATENT OFFICE 2,024,003

PRESSURE GAUGE

Raymond L. Jewell, Millcreek Township, Erie County, Pa., assignor to American Sterilizer Company, Erie, Pa., a corporation of Pennsylvania Application May 5, 1931, Serial No. 535,151

2 Claims. (Cl. 73—31)

Pressure gauges involving Bourdon tubes are unreliable if the pressure gauge is subjected to variations in temperature. To obviate this, it has not been uncommon to connect the pressure gauge through a tube having sufficient turns not only to trap moisture, if steam is used, but also to assure an insulation between the pressure gauge and the medium to which the gauge is subjected. If steam is the medium under pressure which is used with the gauge, it is impractical with any connection heretofore available to connect the Bourdon tube of this gauge with the pressure, or with the short thermal connection subjected to heat without such an exchange of heat to the tube as to make the pressure gauge unreliable. Under these conditions, the tube will ordinarily run as high as 212° and the gauge makers consider a gauge subjected to a temperature of over 150° as unreliable. The present invention is designed to obviate this difficulty providing a connection leading to the Bourdon tube of non-metallic insulating material which will maintain, even though directly connected with the source of pressure medium subjected to heat, such as steam, a temperature at the Bourdon tube low enough to assure reliability of the gauge. Features and details of the invention will appear from the specification and claims.

A preferred embodiment of the invention is illustrated in the accompanying drawing as follows:—

Figure 1:
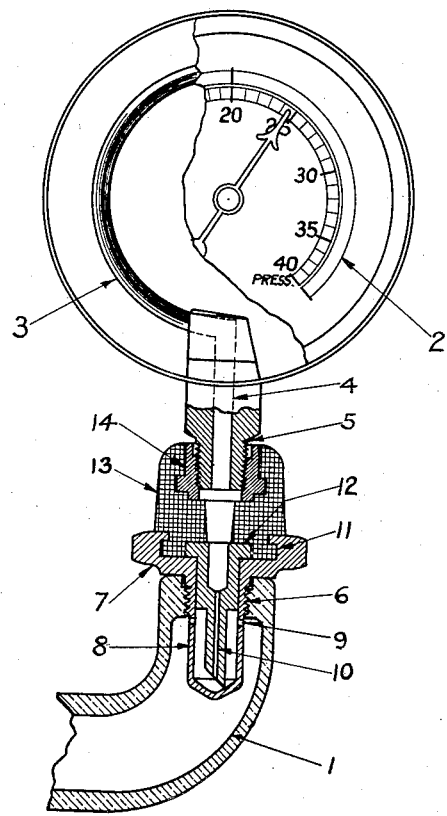

Fig. 1 shows a central section through the device.

Figure 2:
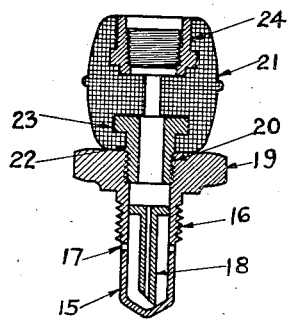

Fig. 2 a central section of a modified insulating connection.

Figure 3:
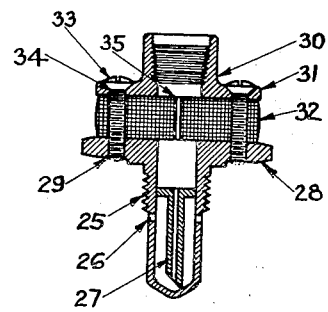

Fig. 3 a further modification of an insulating connection.

I marks the steam chamber, or chamber containing the medium under pressure and heat, 2 the pressure gauge, this gauge comprising a Bourdon tube 3, the Bourdon tube being connected to a connecting fitting having a passage 4 leading through a nipple 5. This is the ordinary pressure gauge.

The steam connection 1 has screw threads 6 and a water trap 7 is screwed into these screw threads. The trap has a shell 8 with openings 9 to the steam chamber and a discharge tube 10 extending down into the shell. The upper end of the shell has an undercut flange 11 and the upper end of the discharge tube also has a flange 12. An insulating connecting means 13 made of nonmetallic material, for example, bakelite, has a passage leading from the tube 10 and a discharge to the passage 4. The bakelite extends into an undercut portion of the flange 11 and the trap as a whole is embedded in the bakelite as it is molded. Similarly a coupling piece 14 is embedded in the upper end of the bakelite connecting piece and interiorly screw threaded and adapted to receive the nipple 5. This makes a short connection between the steam chamber 1 and the tube and insulates the Bourdon tube so that the heat on the Bourdon tube is less than that which will injuriously affect its reliability.

In Fig. 2 the shell 15 of the liquid trap 16 has an opening 17 and a discharge tube 18 leads from the bottom of the shell. The shell is provided with a head 19 which is interiorly screwthreaded at 20. A bakelite connection 21 has a coupling piece 22 secured thereto, the upper end of the coupling piece having a flange 23 which is molded in the bakelite connecting means 21. A coupling piece 24 is embedded in the bakelite at the upper end and is adapted to receive a nipple, such as the nipple 5.

In the modification shown in Fig. 3, the screw-threaded liquid trap 25 has openings 26, a discharge tube 27, and a flange 28 at its upper end. The flange has screw-threaded openings 29. A cap piece 30 has a flange 31 and a bakelite insulating connection 32 is secured between the flanges 28 and 31 by screws 33 which extend through openings 34 in the flange 31 through the bakelite insulating piece 32 and into the openings 29 in the flange 28. The bakelite insulating piece is provided with a passage 35 which forms a connection between the trap and the fitting 30, the fitting 30 being adapted to receive the nipple, as 5, of a pressure gauge. In this case there is a slight metallic connection, but is so slight as to avoid a very material heat exchange.

While I have shown in each of the examples a water trap it will be understood that in very many environments and under many conditions such a water trap is not necessary and may not even be desirable.

What I claim as new is:—

1. In a pressure gauge, the combination of a Bourdon tube; a liquid trap; a tubular non-metallic heat insulating means; and coupling pieces on the insulating means adapted to connect the insulating means with the Bourdon tube and with the trap.

2. In a pressure gauge, the combination of a Bourdon tube; a liquid trap adapted to receive a pressure medium subjected to heat; and a connection between the trap and the Bourdon tube comprising a non-metallic section of heat insulating material.

RAYMOND L. JEWELL.